United States Patent
Zia et al.

(10) Patent No.: US 7,017,707 B2
(45) Date of Patent: Mar. 28, 2006

(54) HERSCHEL-QUINCKE TUBE FOR VEHICLE APPLICATIONS

(75) Inventors: Zhouxuan Zia, Windsor (CA); James Kenneth Vanderveen, Blenheim (CA); Ian McLean, Chatham (CA); Jason Pettipiece, Chatham (CA); Phillip Edward Arthur Stuart, Chatham (CA); Robert Franklin Glassford, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 111 days.

(21) Appl. No.: 10/624,629

(22) Filed: Jul. 22, 2003

(65) Prior Publication Data

US 2004/0118631 A1    Jun. 24, 2004

Related U.S. Application Data (60) Provisional application No. 60/409,205, filed on Sep. 9, 2002, provisional application No. 60/401,161, filed on Aug. 5, 2002, provisional application No. 60/397,708, filed on Jul. 22, 2002.

(51) Int. Cl.
*F01N 1/02* (2006.01)
*F01N 1/08* (2006.01)
*F01N 1/16* (2006.01)
*F01N 1/06* (2006.01)

(52) U.S. Cl. ............... 181/268; 181/273; 181/276; 181/266; 181/253; 181/250

(58) Field of Classification Search ........... 181/268, 181/275, 273, 276, 266, 265, 253, 251, 250; 29/890.08; 123/184.57, 198 E; 180/68.3, 180/68.1

See application file for complete search history.

(56) References Cited

U.S. PATENT DOCUMENTS

| | | | | |
|---|---|---|---|---|
| 1,591,088 A | * | 7/1926 | Holmes | 181/251 |
| 1,739,039 A | * | 12/1929 | Powell | 181/268 |
| 1,740,805 A | * | 12/1929 | Brice | 181/251 |
| 1,910,672 A | * | 5/1933 | Bourne | 181/276 |
| 3,114,432 A | * | 12/1963 | Ludlow et al. | 181/227 |
| 5,014,816 A | * | 5/1991 | Dear et al. | 181/229 |
| 5,033,581 A | * | 7/1991 | Feuling | 181/257 |
| 5,107,800 A | * | 4/1992 | Araki et al. | 123/184.57 |
| 5,441,023 A | * | 8/1995 | Ma | 123/184.57 |

(Continued)

FOREIGN PATENT DOCUMENTS

DE    19849698 A1  *  5/2000

(Continued)

OTHER PUBLICATIONS

U.S. Appl. No. 10/453,274.

(Continued)

*Primary Examiner*—Edgardo San Martin (57) ABSTRACT

An HQ tube arrangement suitable for packaging within a vehicle may be designed by creating a mathematical model representing a tube arrangement having a first passageway and a second passageway fluidly connected to the first passageway at first and second junctions. The second passageway is divided by the junctions into first, second, and third passages. Lengths are associated with each of the first passageway and the first, second, and third passages. A filter parameter, based upon an average transmission loss for a particular frequency over a standard deviation, is analyzed as a function of the lengths. Lengths are chosen based upon analysis of the filter parameter. Portions of the outer walls of the first and second passageways may be secured to or common to one another so that lengths of the passageways run along side of each other to provide a more compact HQ tube arrangement.

17 Claims, 4 Drawing Sheets

U.S. PATENT DOCUMENTS

| | | | |
|---|---|---|---|
| 6,009,705 A * | 1/2000 | Arnott et al. | 60/312 |
| 6,112,514 A * | 9/2000 | Burdisso et al. | 60/226.1 |
| 6,230,832 B1 | 5/2001 | vonMayenburg | |
| 6,364,055 B1 * | 4/2002 | Purdy | 181/279 |
| 6,539,917 B1 * | 4/2003 | Shaw et al. | 123/339.1 |
| 6,595,320 B1 * | 7/2003 | Hwang et al. | 181/253 |
| 6,633,646 B1 * | 10/2003 | Hwang | 381/71.5 |
| 6,772,858 B1 * | 8/2004 | Trochon | 181/224 |
| 6,814,041 B1 * | 11/2004 | Cheng et al. | 123/184.57 |
| 2002/0189897 A1 | 12/2002 | Trochon | |
| 2003/0160472 A1 * | 8/2003 | Xia et al. | 296/65.09 |
| 2003/0221905 A1 * | 12/2003 | Xia | 181/224 |
| 2004/0045767 A1 * | 3/2004 | Byrne et al. | 181/241 |

FOREIGN PATENT DOCUMENTS

| | | | |
|---|---|---|---|
| DE | 10307979 A1 * | 9/2003 | |
| EP | 1070903 A1 * | 1/2001 | |
| GB | 2222852 A * | 3/1990 | |
| GB | 2385567 A * | 8/2003 | |
| JP | 2003106134 A * | 4/2003 | |

OTHER PUBLICATIONS

U.S. Appl. No. 10/360,075.

* cited by examiner

HERSCHEL-QUINCKE TUBE FOR VEHICLE APPLICATIONS

RELATED APPLICATIONS

The application claims priority to U.S. Provisional Application No. 60/409,205 filed Sep. 9, 2002; 60/401,161 filed Aug. 5, 2002; and 60/397,708 filed Jul. 22, 2002.

BACKGROUND OF THE INVENTION

This invention relates to a Herschel-Quincke tube arrangement suitable for vehicle applications, and more particularly, the invention relates to a design and manufacture method and apparatus for producing a compact Herschel-Quincke tube arrangement.

Vehicle air intake systems route air from the environment to the engine for use in the combustion process. Air intake systems include a tube with an opening, typically located at the front of the vehicle proximate to the radiator, extending to the engine throttle. Various passive or active noise cancellation systems may be connected to the air intake and are located within the engine compartment, which because of their size may be difficult to package within the tight confines of modern engine compartments. Furthermore, increasing demands have been placed upon engine compartment space due to styling considerations and additional vehicle systems components.

Quarter wave tubes and Helmholtz resonators are commonly used to generate noise canceling pressure waves in passenger vehicles. Another type of passive noise cancellation structure is a Herschel-Quincke (HQ) tube, which provides superior noise cancellation to other passive noise cancellation systems. HQ tube arrangements cancel noise over a broader frequency band than either quarter wave tubes or Helmholtz resonators. HQ tubes have not been effectively used in passenger vehicle applications because they require a very large amount of space—much more space than is available within the confines of the engine compartment.

The challenge associated with packaging Herschel-Quincke tube arrangements in vehicles has not successfully been achieved for frequencies of a desired range. For example, prior art HQ arrangements have only attempted to tune frequencies between 1,000 to 3,000 Hz that only require short passages, and therefore is easier to fit within the vehicle.

Therefore, what is needed is a way of incorporating a noise cancellation system, such as an HQ tube, into a passenger vehicle to provide improved noise cancellation within the limited vehicle space.

SUMMARY OF THE INVENTION

An HQ tube arrangement suitable for packaging within a vehicle may be designed by creating a mathematical model representing a tube arrangement having a first passageway and a second passageway fluidly connected to the first passageway at first and second junctions. The second passageway is divided by the junctions into first, second, and third passages. Lengths may be associated with each of the first passageway and the first, second, and third passages to produce a particular length combination. A filter parameter, which may be based upon an average transmission loss for a particular frequency over a standard deviation, is calculated for the particular length combination. Other lengths may be associated with the tube arrangement to calculate other filter parameters for the other length combinations. One of the length combinations for the HQ tube arrangement may be selected based upon desired parameters including the filter parameter and tube arrangements having the shortest first passageway, which lends itself to a more compact tube arrangement that is more easily packaged within the confines of a vehicle.

Once the lengths for the passages and passageways have been determined, the HQ tube arrangement may be formed by providing the first and second passageways in generally the same plane. The first and second passageways may be molded from one or more plastic portions secured to one another. The first and second passageways may be bent into a nonplanar configuration to enable the HQ tube arrangement to be secured to a vehicle component in close proximity. For example, the HQ tube arrangement may be bent into an arcuate shape so that it may be secured to a splash shield. Portions of the outer walls of the first and second passageways may be secured to or common to one another so that lengths of the passageways run along side of each other to provide a more compact HQ tube arrangement.

Accordingly, this invention provides a design and manufacturing process that yields a compact HQ tube arrangement suitable for packaging within the limited space of a vehicle.

These and other features of the present invention can be best understood from the following specification and drawings, the following of which is a brief description.

DETAILED DESCRIPTION OF THE PREFERRED EMBODIMENT

Figure 1:
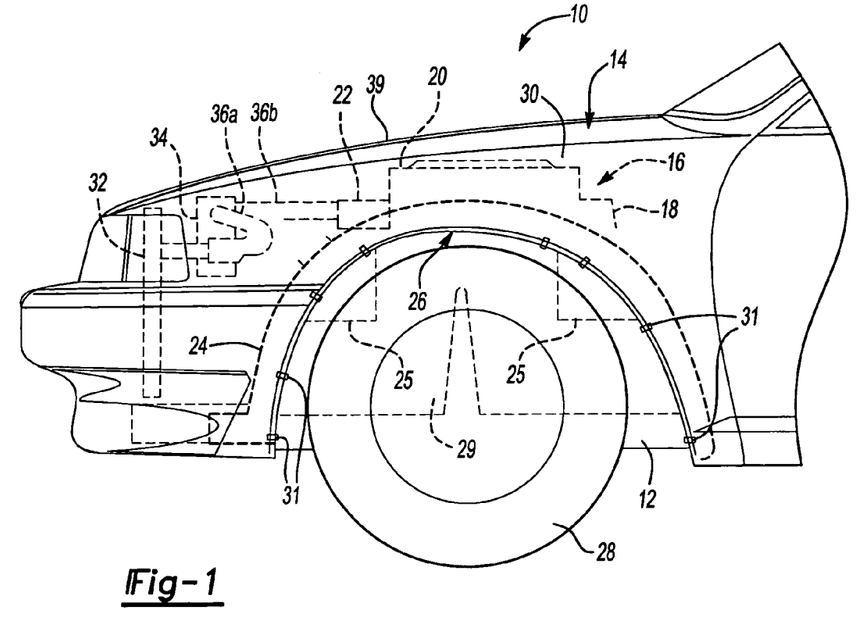
FIG. 1 is a schematic view of a vehicle using this invention.

A vehicle 10 incorporating one example of this present invention is shown in FIG. 1. The vehicle 10 includes a frame 12 and a body 14 supported on the frame 12. The frame 12 and body 14 together define an engine compartment 16 at the forward end of the vehicle 10. However, it is to be understood that this invention may be utilized in a different location, for example, at the rear of the vehicle for rear engine configurations. The vehicle 10 includes an engine 18 having an intake manifold 20 and throttle 22 disposed within the engine compartment 16, as is well known in the art. The inventive HQ tube arrangement may be integrated with a fan shroud 32, as schematically depicted by 32. An air cleaner box 34 may be connected between the fan shroud 32 and the throttle 22 of the engine 18 by tubing 36a and 36b.

Figure 3A:
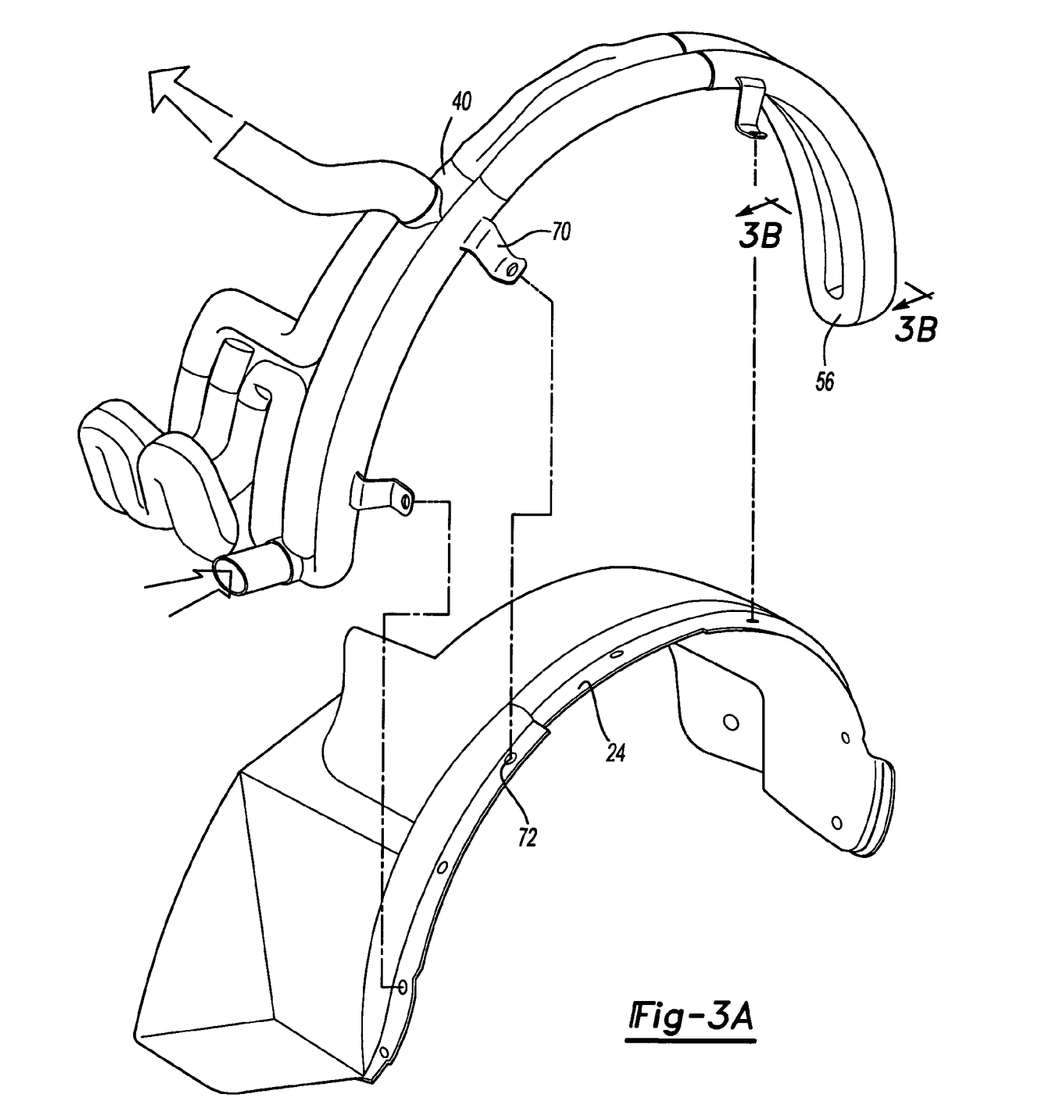
FIG. 3A is an exploded perspective view of the inventive HQ tube arrangement suitable for securing to a splash shield.

A splash shield 24 is arranged between the engine compartment 16 and a body fender 30 to define a wheel well 26. The splash shield 24 is C-shaped and arranged at least partially around a wheel 28 to prevent water and debris from entering the engine compartment 16. The splash shield 24 includes spaced apart downwardly extending flanges 25 that supports a rubber flap 29 arranged between the wheel 28 and the engine compartment 16, as is known in the art, to provide a further barrier to water and debris. In another example, the inventive HQ tube arrangement 40 is secured to the splash shield 24 (FIG. 3A).

Figure 4:
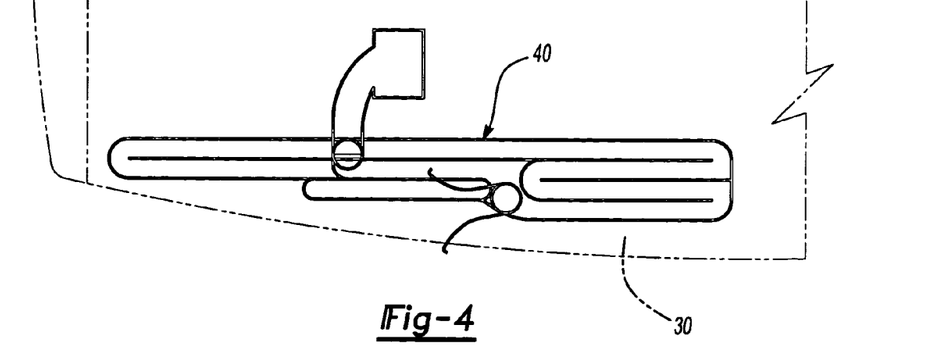
FIG. 4 is a schematic view of the inventive HQ tube arrangement located within a fender.

The fender 30 is secured to the splash shield 24 by fasteners 31 so that the splash shield 24 provides structural support for at least a portion of the fender 30. In yet another example, the inventive HQ tube arrangement 40 is secured to and/or adjacent to the fender 30 (FIG. 4).

Figure 5:
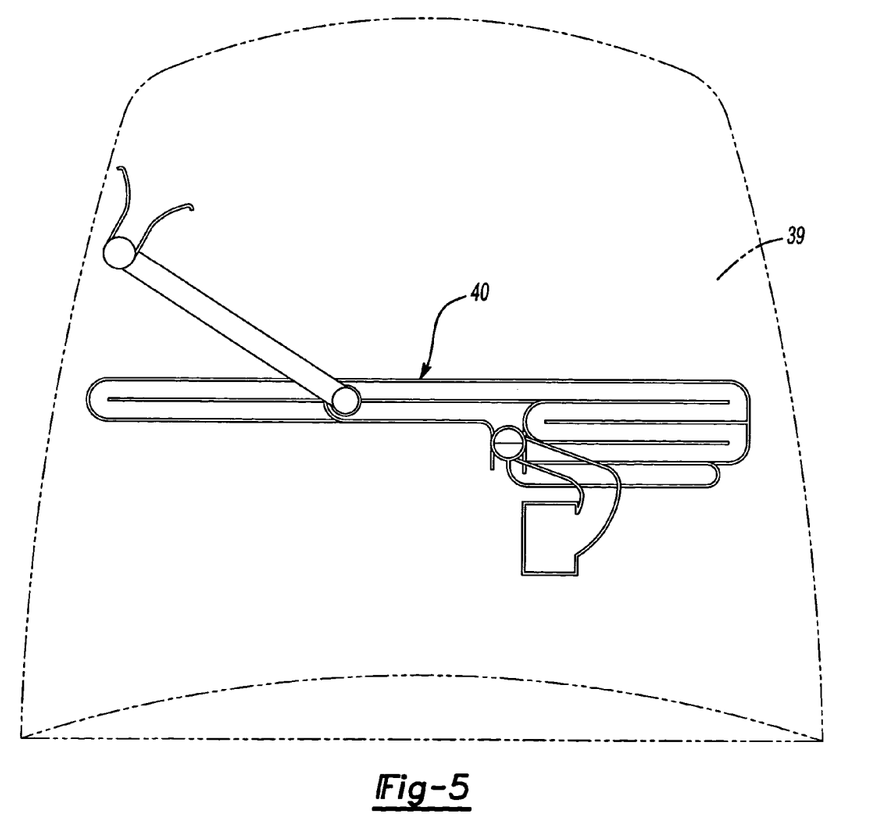
FIG. 5 is a schematic view of an inventive HQ tube arrangement secured to a vehicle engine compartment hood.

An engine compartment hood 39 covers the top of the engine compartment. In still another example, the inventive HQ tube arrangement 40 is secured to the hood 39 (FIG. 5).

While the present invention is described as an HQ tube arrangement, it is also to be understood that this invention may also include other noise cancellation systems such as quarter wave tubes or Helmholtz resonators connected to or integrated with the inventive HQ tube arrangement. HQ tube arrangements require a considerable length of tubing, which prior to this invention was difficult to package given the limited space within the engine compartment.

Figure 2:
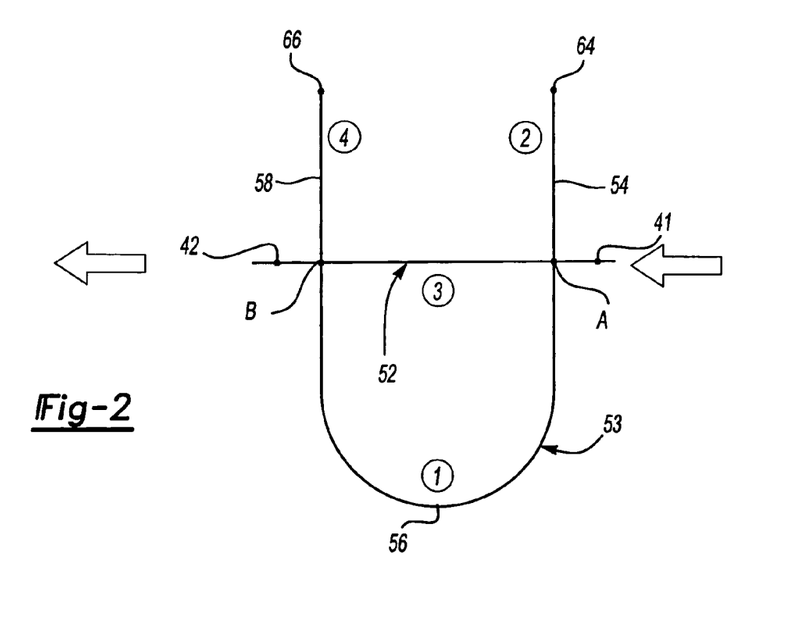
FIG. 2 is a schematic representation of an HQ tube arrangement.

An HQ tube arrangement 40 is shown schematically in FIG. 2. The arrangement includes a first passageway extending from an inlet 41 to an outlet 42. The outlet 42 may be connected directly or by tubes to the throttle 22 or other noise cancellation systems. Similarly, the inlet 41 may be connected to other noise cancellation systems or it may directly receive the air from the environment. The HQ tube arrangement 40 includes a second passageway 53 in fluid communication with the first passageway 52 at a first junction A and a second junction B. The junctions A and B separate the second passageway into first 54, second 56, and third 58 passages. The second passage 56 is defined by the junctions A and B. The first passage 54 terminates in a terminal end 64, and the third passage 58 terminates in a terminal end 66.

A desired noise cancellation frequency is selected for the noise cancellation system. For example, it may be desirable to cancel noise at 90 Hz. Because of the broad frequency of noise cancellation that an HQ tube provides, noise may be cancelled as low as 60 Hz and as high as 120 Hz for a target frequency of 90 Hz. Once the desired noise cancellation frequency has been selected, the lengths of the passages 54, 56, 58, and the first passageway 52 may be determined. The general equation below is used in determining the lengths:

$$\lambda = \frac{c}{f} \text{ where} \qquad \text{Equation 1}$$

$\lambda$ = wave length
$c$ = Speed of sound
$f$ = target frequency.

For a typical HQ tube arrangement, the length of the first passageway 52 is $\lambda/2$ and the length of the second passage 56 is $\lambda$ such that the noise cancellation wave within the second passage 56 is 180° out of phase with the pressure wave traveling in the first passageway 52. Typically, the lengths of the first and third passages 54 and 58 are roughly $$\frac{\lambda}{4}$$

and respectively terminate at ends 64 and 66 so they act as quarter wave tubes. It should be understood, however, that the lengths of the passages may be revised to fine tune the noise cancellation provided by the HQ tube arrangement 40.

The HQ tube arrangement 40 may be designed and optimized by determining an acoustic filter characteristic and computing a filter parameter $\alpha$ for any combination of tube lengths. The filter parameter $\alpha$ is given by the ratio of the average transmission loss over a specified frequency to the standard deviation of the transmission loss over the same specified frequency range.

$$\alpha = \frac{TL}{\sigma} \qquad \text{Equation 2}$$

The transmission loss at any frequency is defined as:

$$TL = 20 \times \log\left(\frac{P_A}{P_S}\right). \qquad \text{Equation 3}$$

The pressure ratio in Equation 3 is the ratio of the acoustic pressure entering junction A, $P_A$ to the acoustic pressure transmitted past junction B, $P_B$ and is given by:

$$\frac{P_A}{P_B} = \qquad \text{Equation 4}$$

$$\frac{1 - 2e^{i(\phi_1+\phi_3)}(1+e^{i\phi_2})(1+e^{i\phi_4}) - (e^{i2\phi_1}+e^{i2\phi_3})e^{i(\phi_2+\phi_4)}+e^{i2(\phi_1+\phi_3)}(1+2e^{i\phi_4})(1+2e^{i\phi_2})}{(e^{i\phi_1}+e^{i\phi_3})(e^{i(\phi_1+\phi_3)}-1)(e^{i\phi_2}+1)(e^{i\phi_4}+1)}$$

where:

$$\phi_1 = \frac{2\pi l_1}{\lambda} \qquad \text{Equation 5}$$

$$\phi_2 = \frac{4\pi l_2}{\lambda} \qquad \text{Equation 6}$$

$$\phi_3 = \frac{2\pi l_3}{\lambda} \qquad \text{Equation 7}$$

$$\phi_4 = \frac{4\pi l_4}{\lambda} \qquad \text{Equation 8}$$

The tubes indicated by subscripts correspond to the circled numerals in FIG. 2.

The average transmission loss over the frequency range of a Hz which is the low end of the frequency range, to b Hz which is the high end of the frequency range is:

$$\overline{TL} = \left(\frac{1}{BW}\right) \times \int_a^b \left(\frac{P_A}{P_B}\right) df; \quad \text{Equation 9}$$

$$BW = a - b$$

and the standard deviation is given by:

$$\sigma = \sqrt{\left(\frac{1}{BW}\right) \times \int_a^b (\overline{TL} - TL)^2 df} \quad \text{Equation 10}$$

The lengths of the four tubes, indicated by the circled numerals 1–4 in FIG. 2, are independently varied over a specified range, and the transmission loss is calculated for each frequency at a specified range for each combination of tube lengths. The filter parameter α is then computed for each tube length combination. The combination of tube lengths which generates the maximum value for α is the desired configuration since this combination has the largest average transmission loss with the least ripple over the specified frequency range.

An additional constraint is imposed for packaging purposes. The more desirable tube combinations are those in which the tube length of the first passageway 52, indicated by the circled numeral 3, was the shortest of the four tubes. This constraint was desirable to minimize the flow restriction of the HQ tube arrangement 40 and to minimize the packaging length so that the device could be easily installed under the vehicle hood.

Figure 6:
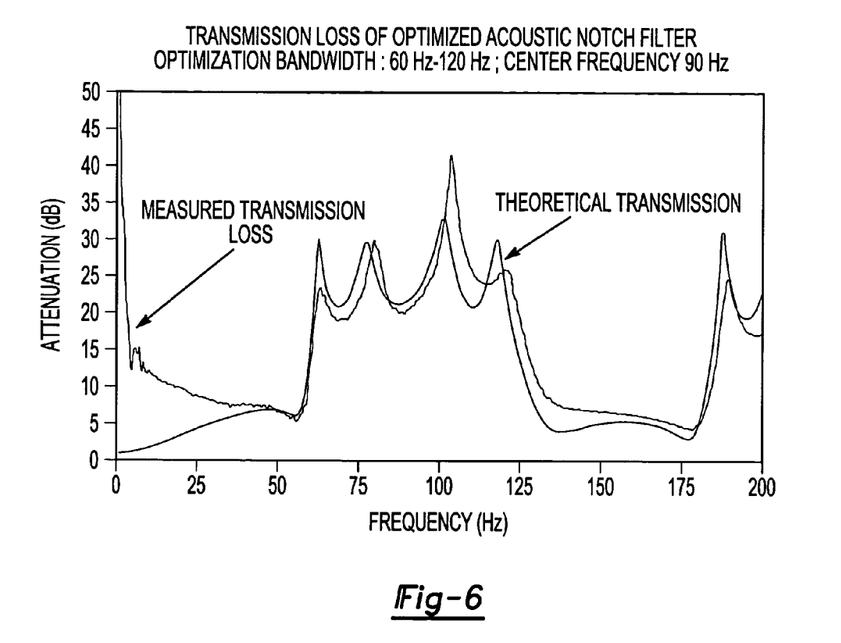
FIG. 6 graphically depicts the actual transmission loss as compared to the theoretical transmission loss for the inventive HQ tube arrangement.

The computed transmission loss compared to the measured transmission loss for an optimized acoustic filter with a center frequency of 90 Hz and a bandwidth of 60 Hz is shown in FIG. 6. For this example filter design, the filter parameter α was 7.7, the tube length 1 was 2.78 meters, tube length 2 was 0.72 meters, tube length 3 was 0.58 meters, and tube length 4 was 1.3 meters. The inside tube diameter was 50 mm for both the first 52 and second 53 passageways. This particular arrangement had an average transmission loss of about 26 db, and as a result, will effectively attenuate the low frequency "boom" noise emanating either from the induction inlet or exhaust outlet. Also, the inventive design method provided "quarter wave tube" lengths that were unequal.

FIGS. 3A–5 depict the inventive HQ tube arrangement package within the engine compartment of the vehicle. FIG. 3A depicts an HQ tube arrangement 40 having a flange or first connection 70 extending from the body of the HQ tube arrangement 40. A splash shield 24 has a second connection 72, which may be apertures, for securing the first connection 70 to the second connection 72 with fasteners.

Figure 3B:
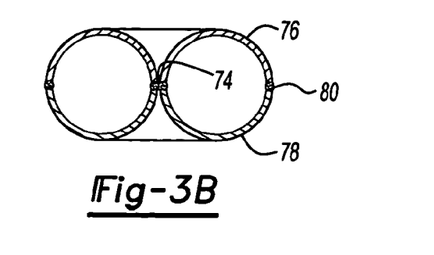
FIG. 3B is a cross-sectional view through the HQ tube arrangement taken along lines 3B—3B of FIG. 3A.

Even with the tube lengths and diameters optimized using the inventive design process, the HQ tube arrangement 40 is still difficult to package within a vehicle. Accordingly, it is an aspect of this invention to arrange portions of the tubes adjacent to one another so that they double back along side one another and, more preferably, share a common wall. Referring to FIG. 3B, two tube portions are shown adjacent to one another sharing a common wall 74. The portions are formed by securing the first 76 and second 78 portions to one another by a weld bead 80 formed by vibration welding or by any other suitable securing means. The size of the HQ tube arrangement 40 may be dramatically reduced or minimized by having the tubes in the areas of the junctions A and B arranged adjacent to one another, as shown in the Figures. As can be seen in the Figures, the tubes are arranged in an adjoining relationship to one another whenever possible to minimize the size of the HQ tube arrangement 40.

The inventive HQ tube arrangement 40 may be arranged adjacent to a fender 30, or connected to the fender 30, as best shown in FIG. 4. As another example, the HQ tube arrangement 40 may be secured to a vehicle hood 39, as shown in FIG. 5.

The HQ tube arrangement may be manufactured by forming the first 52 and second 53 passageways generally planar to one another with the convolutes preferably already formed so that portions of the tube are adjacent to one another. The HQ tube arrangement 40 may be manufactured using any suitable forming process, such as by injection molding, blow molding, vacuum forming, or thermo-forming plastics. The present invention may be constructed from aluminum or steel sheet metal formed by stamping and then welded. One suitable plastic may be a 20% talc filled polypropylene. The plastic pieces are welded together using any suitable process. The first 52 and second 53 passageways may then be bent into a nonplanar configuration into a shape suitable for securing to one of the components within the engine compartment, such as the splash shield 24, fender 30, or hood 39. The HQ tube arrangement may be heated to facilitate bending the structure into a desired shape. The HQ tube arrangement 40 is then secured to the component.

Figure 7:
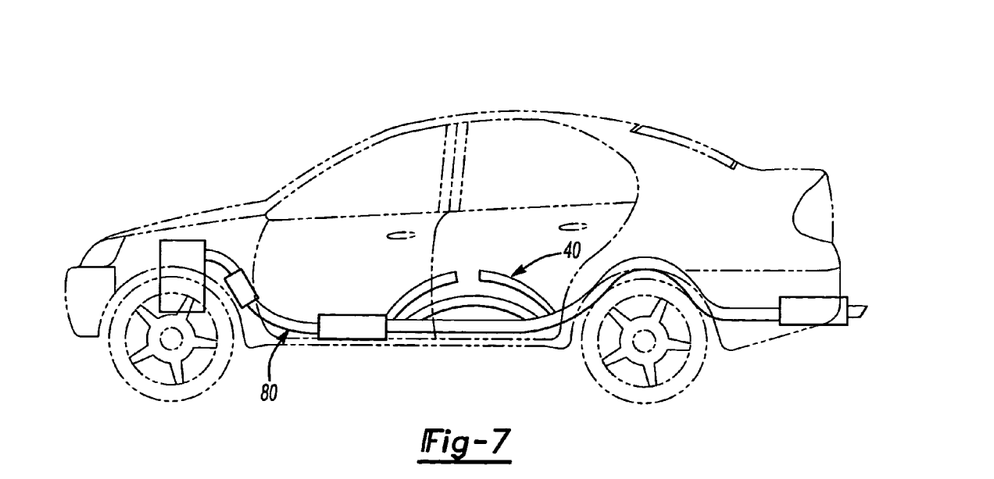
FIG. 7 depicts the inventive HQ tube arrangement used with a vehicle exhaust system.

In another aspect of this invention, the HQ tube arrangement 40 may be used with the vehicle exhaust system 80, as shown in FIG. 7. The HQ tube arrangement 40 may be constructed from a material suitable for exhaust system application such as metal and connected with the exhaust system 80 using processes known to those of ordinary skill in the art.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of designing a Herschel-Quincke tube arrangement comprising the steps of:
    a) representing a tube arrangement including a first passageway and second passageway fluidly connected to the first passageway at first and second junctions, the second passageway divided by the junctions into first, second, and third passages;
    b) associating lengths with each of the first passageway and the first, second, and third passages producing a particular length combination;
    c) calculating a filter parameter for the particular length combination based upon a target frequency range;
    d) associating other lengths with each of the passageway and the first, second, and third passages producing another particular length combination;
    e) calculating another filter parameter for the other particular length combination based upon the target frequency range; and
    f) selecting one of the length combinations for the Herschel-Quincke tube arrangement based upon desired parameters including the filter parameters.

2. The method according to claim 1, wherein calculating the filter parameters includes determining a transmission loss based upon a pressure ratio of the pressures at the junctions.

3. The method according to claim 2, wherein the filter parameters are logarithmic functions of the pressure ratio.

4. The method according to claim 1, wherein the filter parameters are an average transmission loss for the target frequency range over a standard deviation of the transmission loss for the target frequency range.

5. The method according to claim 4, wherein the standard deviation is a function of bandwidth of the target frequency range.

6. The method according to claim 4, wherein the desired parameters include the highest filter parameter.

7. The method according to claim 6, wherein the desired parameters include a shortest length of the first passageway for the length combinations.

8. A method of manufacturing a Herschel-Quincke tube arrangement comprising the steps of:
   a) forming a first passageway and second passageway fluidly connected to the first passageway at first and second junctions with the second passageway divided by the junctions into first, second, and third passages, the first and second passageways being generally planar, the first passageway extending from an inlet to the tube arrangement to an outlet from the tube arrangement;
   b) forming the first passangaeway in a nonplanar configuration; and
   c) securing at least one of the first and second passageways to a vehicle component; and
   d) coupling the outlet to a vehicle engine.

9. The method according to claim 8, wherein step a) includes molding the first and second passageways with plastic.

10. The method according to claim 9, wherein step a) includes securing first and second portions to one another to form the first and second passageways.

11. The method according to claim 8, wherein the first and second passageways are constructed from a flexible material.

12. The method according to claim 8, wherein step b) includes heating the first and second passageway to make the passageways more pliable.

13. A method of designing a Herschel-Quincke tube arrangement comprising the steps of:
   a) representing a tube arrangement including a first passageway and second passageway fluidly connected to the first passageway at first and second junctions, the second passageway divided by the junctions into first, second, and third passages;
   b) associating lengths with each of the first passageway and the first, second, and third passages;
   c) analyzing a ratio of average transmission loss over a selected frequency range to standard deviation of the transmission loss over the selected frequency range as a function of the lengths of the first, second and third passages and the first passageway; and
   d) based upon the analysis of the ratio in said step e), selecting lengths for each of the first, second and third passages and the first passageway for the Herschel-Quincke tube arrangement;
wherein the second passage looped about a first axis and curved about a second axis not parallel to the first axis.

14. The method of claim 13 wherein the step of selecting in said step d) is further based upon the length of the first passageway, wherein the first passageway includes an inlet to the tube arrangement and an outlet from the tube arrangement.

15. The method of claim 8 wherein the inlet is not parallel to the outlet.

16. The method of claim 8 wherein the second passageway is formed in a nonplanar configuration.

17. The method of claim 8 wherein the first and third passages extend from the first and second junctions, respectively, and wherein the first and third passages each have a closed end opposite the respective junction.

* * * * *

UNITED STATES PATENT AND TRADEMARK OFFICE
CERTIFICATE OF CORRECTION

| | | |
|---|---|---|
| PATENT NO. | : 7,017,707 B2 | Page 1 of 1 |
| APPLICATION NO. | : 10/624629 | |
| DATED | : March 28, 2006 | |
| INVENTOR(S) | : Robert Franklin Glassford et al. | |

It is certified that error appears in the above-identified patent and that said Letters Patent is hereby corrected as shown below:

On Title of issued patent, Item [75] please correct inventor name as follows:

Delete "Zhouxuan, Zia"

Replace with --Zhouxuan, Xia--

Signed and Sealed this

Sixth Day of March, 2007

JON W. DUDAS
*Director of the United States Patent and Trademark Office*